Figure 1:
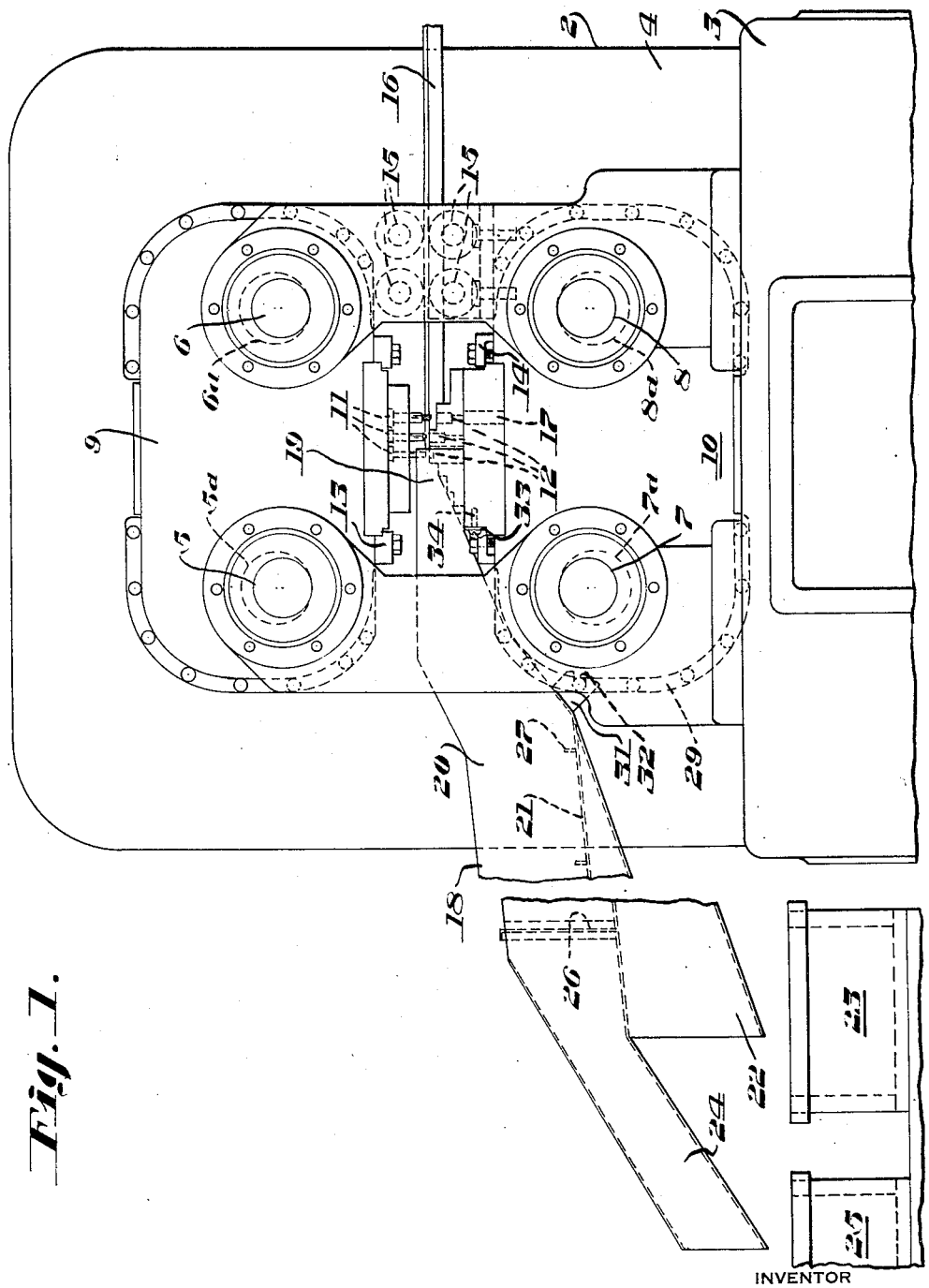

INVENTOR
GUY O. CONNER

Patented Feb. 20, 1951

2,542,630

UNITED STATES PATENT OFFICE 2,542,630

FORMING MACHINE

Guy O. Conner, Cleveland Heights, Ohio, assignor, by mesne assignments, to Danly Machine Specialties, Inc., a corporation of Illinois Application August 8, 1947, Serial No. 767,609

6 Claims. (Cl. 164—89)

This invention relates to forming machines and particularly to forming machines to which material is fed and which form pieces of different sizes. The invention has to do especially with the separation of pieces of different size formed in a forming machine so that the pieces are separately delivered according to their respective sizes.

It is well known to use separators in connection with stamping and similar machines to separate pieces of different size formed therein, as, for example, work blanks and scrap pieces. It has heretofore been customary to mount a separator adjacent a stamping machine so that the pieces formed in the stamping machine have been delivered to the separator and providing means such as a crank for agitating the separator to cause separation of the work blanks and scrap pieces. The separator hs been separately mounted and provided with its own agitating mechanism. It has consumed floor space and the means for agitating it has added considerable expense to the installation. In addition the separator actuating mechanism has required upkeep and repair and has thus increased labor cost. Still further, the separator actuating mechanisms heretofore proposed have not actuated the separators to effect separation of pieces of different size with desired efficiency.

I have devised separating mechanism for use in a forming machine which obviates all of the disadvantages of prior separators pointed out above. I mount my separator directly on a head of the forming machine so that no separate mounting and no separate operating mechanism for the separator is required. The separator partakes of the cyclic movement of a head of the forming machine. It is preferably rigidly fastened to the head so as to be in effect an integral part thereof.

My separator may be employed in any forming machine which has a cyclically movable head, the separator being designed to receive the pieces formed in the forming machine as they are delivered from the dies. Desirably the separator is fastened to a head of a forming machine which is mounted for generally rotary movement, preferably in a generally vertical plane as this imparts to the separator a movement which not only brings about agitation to effect separation of the pieces but also tends to advance the pieces along the separator and thereby greatly increases the efficiency of the separating action. Desirably I employ a Conner type forming machine such as the machines disclosed in my issued patents, for example, Patent No. 2,406,808. Such machine comprises opposed cooperating forming heads each mounted for generally rotary movement while being guided so as to maintain substantially fixed orientation, the heads during operation of the machine moving toward and away from each other and when closest together moving also laterally generally in the same direction. However, my separator may be employed in a machine having only one head mounted for rotary movement, the other head being, for example, translatable in synchronism with a trace of the rotary head.

Other details, objects and advantages of the invention will become apparent as the following description of a present preferred embodiment thereof proceeds.

Figure 2:
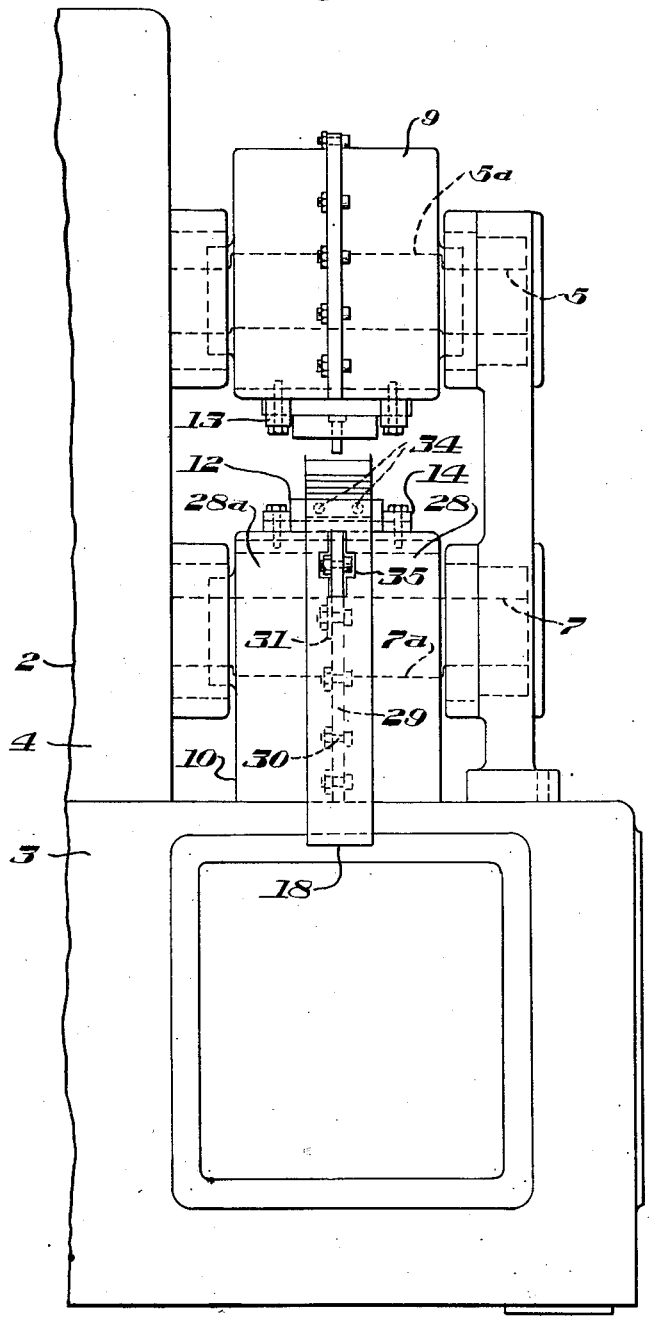

In the accompanying drawings I have shown a present preferred embodiment of the invention, in which Figure 1 is a side elevational view of a forming machine having a separator fastened to its lower head; and Figure 2 is an end elevational view of the forming machine shown in Figure 1.

Referring now more particularly to the drawings, there is shown a forming machine designated generally by reference numeral 2 which is of the Conner type. It comprises a base 3 carrying a frame 4 in which are mounted four horizontal parallel shafts, two upper shafts 5 and 6 and two lower shafts 7 and 8. The shafts 5 and 6 are in the same horizontal plane and the shafts 7 and 8 are in the same horizontal plane. The shafts 5 and 7 are in the same vertical plane and the shafts 6 and 8 are in the same vertical plane. The shafts 5 and 6 rotate in the same direction at the same speed. The shafts 7 and 8 likewise rotate in the same direction at the same speed, which is the same as the speed of rotation of the shafts 5 and 6, but the direction of rotation of the shafts 7 and 8 is opposite to the direction of rotation of the shafts 5 and 6. With reference to Figure 1 the shafts 5 and 6 rotate in the clockwise direction and the shafts 7 and 8 rotate in the counterclockwise direction. Each of the shafts 5, 6, 7 and 8 carries eccentrics, the respective eccentrics being designated 5a, 6a, 7a and 8a. An upper working head 9 is journaled upon the eccentrics 5a and 6a and a lower working head 10 is journaled upon the eccentrics 7a and 8a. The eccentrics 5a and 6a are angularly disposed on their shafts 180° from the eccentrics 7a and 8a; thus, when the high points of the eccentrics 5a and 6a are up the high points of the eccentrics 7a and 8a are down and vice versa. In Figure 1 the high points of the eccentrics 5a and 6a are up and the high points of the eccentrics 7a and 8a are down, so the heads 9 and 10 are in their farthest apart position. As the shafts rotate the respective heads partake of rotary or orbital movement in opposite directions at the same speed and when the heads are closest together they move laterally (toward the left, viewing Figure 1) in the same direction. Die means 11 are mounted in the head 9 and die means 12 are mounted in the head 10. The die means may be applied to the forming machine as a die set, the upper portion of which is clamped to the head 9 by clamps 13 and the lower portion of which is clamped to the head 10 by clamps 14. Stock, which may be in the form of strip of metal or other material, is fed to the machine from right to left, viewing Figure 1, by any suitable feeding mechanism. Feed rolls 15 are shown in dotted lines in Figure 1. The stock may be guided by a stock guide 16.

Since the present invention does not reside in the forming machine per se and since the forming machine itself may be like the forming machines disclosed in my issued patents I shall not describe in detail the driving mechanism employed therein. It is sufficient for present purposes to mention that strip is fed to the forming machine along the stock guide 16 by the feed rolls 15 and that it is acted upon by the dies 11 and 12. The particular form of the dies 11 and 12 does not constitute a limitation on the present invention; any dies may be employed. The dies shown are for stamping hexagonal nut blanks out of metal strip. The scrap is cut up by the dies into small pieces, indeed pieces which are smaller than the nut blanks. The strip completely loses its identity as strip when it is operated on by the dies. The nut blanks and the pieces of scrap are delivered from between the dies toward the left, viewing Figure 1. It may be mentioned that small circular pieces of scrap are first punched out to form the holes in the nut blanks, those pieces falling down through a delivery opening 17 in the lower die. The scrap pieces which are delivered with the nut blanks are the pieces of the strip disposed between the pieces constituting the nut blanks.

There is provided a separator in the form of a chute 18. The chute may be made of sheet metal, plastic or any other suitable material. It has a relatively shallow mouth 19 adapted to deliver pieces to a portion 20 having a perforated bottom 21. The perforations in the portion 21 are intermediate in size between the size of the nut blanks and the size of the scrap pieces so that when the nut blanks and scrap pieces move over the portion 21 and the chute is agitated the scrap pieces fall through while the nut blanks do not fall through. The scrap pieces are delivered through a scrap chute 22 into a scrap receptacle 23. The blanks are delivered through a blank chute 24 into a blank receptacle 25. A slidable door 26 is provided for temporarily preventing passage of nut blanks to the blank chute 24 when a filled receptacle 25 is being replaced by an empty receptacle. Baffles 27 are provided in the chute which are disposed at the portion 21 thereof and extend crosswise. The purpose of the baffles is to insure more or less uniform movement of the pieces over the perforated portion 21 to insure that all of the scrap pieces pass through that portion.

The lower head 10 comprises parts 28 and 28a having opposed flanges 29 through which they are bolted together by bolts 30. The chute has a lug 31 having a slot 32 adapted to receive one of the bolts 30 to assist in fastening the chute to the head 10. The chute also has a lug 33 through which it is fastened to the lower die 12 by screws 34. The chute has a slot 35 in its bottom just large enough to receive the portions of the flanges 29 at the upper left hand margin of the head 10, viewing Figure 1. The mouth 19 of the chute is disposed between the heads 9 and 10 in position to receive the nut blanks and scrap pieces.

By the means above described the chute 18 is fastened to the lower head 10 so as in effect to be integral therewith. No separate mounting means for the chute and no separate means for agitating it are needed. The chute partakes of the rotary or orbital movement of the lower head. Thus without any separate operating mechanism whatever the chute is agitated to cause separation of the blanks and scrap. Moreover, the orbital movement of the chute is such that it tends to advance the pieces along it as it is being agitated and thereby greatly increases the separating efficiency. As the head 10 and hence the chute moves downwardly and to the right it tends to momentarily drop out from beneath the pieces and to thereby allow the pieces to be picked up by a portion of the chute farther advanced than the portion on which they previously rested. As the head and hence the chute moves to the left, viewing Figure 1, the pieces are further advanced to complete the cycle.

While I have shown and described a present preferred embodiment of the invention it is to be distinctly understood that the invention is not limited thereto but may be otherwise variously embodied within the scope of the following claims.

I claim:

1. In a forming machine having upper and lower heads and in which at least the lower head is cyclically movable and carries die means cooperating with die means carried by the upper head to form out of material fed to the machine pieces of different size, a separator for separating and separately delivering said pieces according to their respective sizes, the separator comprising a chute having a perforated bottom portion the perforations of which are of such size and shape and so arranged that when said pieces are delivered to the chute and the chute is agitated certain of said pieces pass through perforations in said bottom portion of the chute and certain of said pieces do not pass through perforations in said bottom portion of the chute, and means fastening the chute to the lower head with its mouth disposed between the upper and lower heads adjacent the dies to receive said pieces as they are delivered from the dies so that the chute partakes of the cyclical movement of the lower head and is thereby agitated.

2. In a forming machine comprising opposed cooperating heads each mounted for generally rotary movement while being guided so as to maintain substantially fixed orientation, said heads during operation of the machine moving toward and away from each other and when closest together moving also laterally generally in the same direction, said heads carrying die means adapted cooperatively upon operation of the machine to form out of material fed to the machine pieces of different size, a separator for separating and separately delivering said pieces according to their respective sizes, the separator comprising a perforate member having perforations of such size and shape and so arranged that when said pieces are delivered thereto and said member is agitated certain of said pieces pass through perforations in said member and certain of said pieces do not pass through perforations in said member, and means fastening said member to one of said heads in position to receive said pieces as they are delivered from the dies so that said member partakes of the movement of the head to which it is fastened and is thereby agitated.

3. In a forming machine comprising opposed cooperating upper and lower heads each mounted for generally rotary movement while being guided so as to maintain substantially fixed orientation, said heads during operation of the machine moving toward and away from each other and when closest together moving also laterally generally in the same direction, said heads carrying die means adapted cooperatively upon operation of the machine to form out of material fed to the machine pieces of different size, a separator for separating and separately delivering said pieces according to their respective sizes, the separator comprising a perforate member having perforations of such size and shape and so arranged that when said pieces are delivered thereto and said member is agitated certain of said pieces pass through perforations in said member and certain of said pieces do not pass through perforations in said member, and means fastening said member to the lower head in position to receive said pieces as they are delivered from the dies so that said member partakes of the movement of the head to which it is fastened and is thereby agitated.

4. In a forming machine comprising opposed cooperating heads at least one of which is mounted for generally rotary movement while being guided so as to maintain substantially fixed orientation, said heads during operation of the machine being relatively movable toward and away from each other and when they are closest together being movable laterally generally in the same direction, said heads carrying die means adapted cooperatively upon operation of the machine to form out of material fed to the machine pieces of different size, a separator for separating and separately delivering said pieces according to their respective sizes, the separator comprising a perforate member having perforations of such size and shape and so arranged that when said pieces are delivered thereto and said member is agitated certain of said pieces pass through perforations in said member and certain of said pieces do not pass through perforations in said member, and means fastening said member rigidly to said head which is mounted for generally rotary movement while being guided so as to maintain substantially fixed orientation and in position to receive said pieces as they are delivered from the dies so that said member is in effect an integral part of said head and moves therewith as a unit whereby said member is agitated and also by its movement tends to advance said pieces therealong.

5. In a forming machine comprising opposed cooperating upper and lower heads at least the lower one of which is mounted for generally rotary movement in a generally vertical plane while being guided so as to maintain substantially fixed orientation, said heads during operation of the machine being relatively movable toward and away from each other and when they are closest together being movable laterally generally in the same direction, said heads carrying die means adapted cooperatively upon operation of the machine to form out of material fed to the machine pieces of different size, a separator for separating and separately delivering said pieces according to their respective sizes, the separator comprising a perforate member having perforations of such size and shape and so arranged that when said pieces are delivered thereto and said member is agitated certain of said pieces pass through perforations in said member and certain of said pieces do not pass through perforations in said member, and means fastening said member rigidly to the lower head in position to receive said pieces as they are delivered from the dies so that said member is in effect an integral part of said lower head and moves therewith as a unit whereby said member is agitated and also by its movement tends to advance said pieces therealong.

6. In a forming machine comprising opposed cooperating heads at least one of which is mounted for generally rotary movement in a generally vertical plane while being guided so as to maintain substantially fixed orientation, said heads during operation of the machine being relatively movable toward and away from each other and when they are closest together being movable laterally generally in the same direction, said heads carrying die means adapted cooperatively upon operation of the machine to form out of material fed to the machine pieces of different size, a separator for separating and separately delivering said pieces according to their respective sizes, the separator comprising a chute having a perforated bottom portion the perforations of which are of such size and shape and so arranged that when said pieces are delivered to the chute and the chute is agitated certain of said pieces pass through perforations in said bottom portion of the chute and certain of said pieces do not pass through perforations in said bottom portion of the chute, and means fastening the chute rigidly to said head which is mounted for generally rotary movement in a generally vertical plane while being guided so as to maintain substantially fixed orientation and with its mouth disposed in position to receive said pieces as they are delivered from the dies so that the chute is in effect an integral part of said head and moves therewith as a unit whereby the chute is agitated and also by its movement tends to advance said pieces therealong.

GUY O. CONNER.

REFERENCES CITED

The following references are of record in the file of this patent:

UNITED STATES PATENTS

| Number | Name | Date |
|---|---|---|
| 1,066,727 | Grover | July 8, 1913 |
| 1,302,697 | Moussette | May 6, 1919 |
| 1,337,924 | Lautner | Apr. 20, 1920 |
| 1,344,975 | Baxter | June 20, 1920 |
| 1,620,687 | Reese | Mar. 15, 1927 |
| 2,406,808 | Conner | Sept. 3, 1946 |

FOREIGN PATENTS

| Number | Country | Date |
|---|---|---|
| 27,384 | Norway | Oct. 30, 1916 |